United States Patent
Hirabayashi et al.

(10) Patent No.: US 10,600,557 B2
(45) Date of Patent: Mar. 24, 2020

(54) REACTOR HAVING AIR DISCHARGE PATHS

(71) Applicants: AUTONETWORKS TECHNOLOGIES, LTD., Yokkaichi, Mie (JP); SUMITOMO WIRING SYSTEMS, LTD., Yokkaichi, Mie (JP); SUMITOMO ELECTRIC INDUSTRIES, LTD., Osaka-shi, Osaka (JP)

(72) Inventors: Tatsuo Hirabayashi, Yokkaichi (JP); Takashi Misaki, Yokkaichi (JP); Seiji Shitama, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/162,808

(22) Filed: Oct. 17, 2018

(65) Prior Publication Data
US 2019/0131058 A1 May 2, 2019

(30) Foreign Application Priority Data
Oct. 27, 2017 (JP) .................. 2017-208666

(51) Int. Cl.
H02K 1/32 (2006.01)
H02K 3/24 (2006.01)
(Continued)

(52) U.S. Cl.
CPC .......... *H01F 27/2876* (2013.01); *H01F 3/08* (2013.01); *H01F 3/14* (2013.01); *H01F 27/022* (2013.01);
(Continued)

(58) Field of Classification Search
CPC .......... H01F 3/08; H01F 27/022; H01F 27/22; H01F 27/255; H01F 27/2876; H01F 3/14;
(Continued)

(56) References Cited

U.S. PATENT DOCUMENTS

| 5,231,554 A * | 7/1993 | Goto ...................... G11B 5/105 360/125.01 |
| 2003/0058075 A1 * | 3/2003 | Iwao ..................... H01F 27/022 336/94 |

(Continued)

FOREIGN PATENT DOCUMENTS

JP 2017-028142 A 2/2017

*Primary Examiner* — Nguyen Tran
*Assistant Examiner* — David A. Singh
(74) *Attorney, Agent, or Firm* — Oliff PLC

(57) ABSTRACT

Provided is a reactor in which it is possible to reduce molding failures in inner resin portions when molding the inner resin portions. A reactor includes: a coil having winding portions; and a magnetic core having inner core portions and outer core portions. The reactor further includes: inner resin portions that fill gaps between the winding portions and the inner core portions; and inner interposed members that are interposed between the winding portions and the inner core portions, and form resin flow paths. The inner interposed members have spacers arranged between the winding portions and the inner core portions. The spacers are provided with air discharge paths that are in communication with the resin flow paths, and extend in the axial direction of the winding portions to at least one end face side of the winding portions.

2 Claims, 7 Drawing Sheets

(51) Int. Cl.
*H02K 3/34* (2006.01)
*H02K 5/20* (2006.01)
*H02K 9/00* (2006.01)
*H01F 27/02* (2006.01)
*H01F 27/08* (2006.01)
*H01F 27/28* (2006.01)
*H01F 3/14* (2006.01)
*H01F 17/04* (2006.01)
*H01F 3/08* (2006.01)
*H01F 27/22* (2006.01)
*H01F 27/255* (2006.01)
*H01F 37/00* (2006.01)
*H02K 9/02* (2006.01)
*H02K 9/04* (2006.01)

(52) U.S. Cl.
CPC ........... *H01F 27/22* (2013.01); *H01F 27/255* (2013.01); *H01F 37/00* (2013.01); *H01F 27/025* (2013.01); *H01F 27/085* (2013.01); *H01F 2017/048* (2013.01); *H02K 1/32* (2013.01); *H02K 3/24* (2013.01); *H02K 3/345* (2013.01); *H02K 5/20* (2013.01); *H02K 9/00* (2013.01); *H02K 9/005* (2013.01); *H02K 9/02* (2013.01); *H02K 9/04* (2013.01); *H02K 2209/00* (2013.01)

(58) Field of Classification Search
CPC ...... H01F 27/008; H01F 27/02; H01F 27/025; H01F 27/08; H01F 27/085; H01F 27/20; H01F 27/24; H01F 27/28; H01F 27/2895; H01F 37/00; H01F 2017/048; H02K 1/04; H02K 1/32; H02K 3/24; H02K 3/30; H02K 3/32; H02K 3/34; H02K 3/345; H02K 5/00; H02K 5/02; H02K 5/04; H02K 5/20; H02K 9/00; H02K 9/005; H02K 9/02; H02K 9/04; H02K 9/14; H02K 9/16; H02K 9/28; H02K 15/0025; H02K 15/0037; H02K 15/0043; H02K 2209/00

See application file for complete search history.

(56) References Cited

U.S. PATENT DOCUMENTS

| | | | | |
|---|---|---|---|---|
| 2007/0013259 | A1* | 1/2007 | Nakamura | H02K 1/20 310/254.1 |
| 2012/0092120 | A1* | 4/2012 | Yoshikawa | H01F 7/022 336/220 |
| 2012/0098631 | A1* | 4/2012 | Ono | H01F 3/14 336/96 |
| 2013/0127579 | A1* | 5/2013 | Ueno | H01F 37/00 336/212 |
| 2013/0181801 | A1* | 7/2013 | Yoshikawa | H01F 27/30 336/180 |
| 2014/0085026 | A1* | 3/2014 | Yamada | H01F 37/00 336/90 |
| 2014/0218152 | A1* | 8/2014 | Ueno | H01F 37/00 336/165 |
| 2014/0218158 | A1* | 8/2014 | Miyamoto | H01F 7/306 336/198 |
| 2014/0320249 | A1* | 10/2014 | Nobusaka | H01F 7/02 336/90 |
| 2015/0162119 | A1* | 6/2015 | Nakatsu | H01F 7/306 336/105 |
| 2015/0325357 | A1* | 11/2015 | Yamaguchi | H01F 27/24 336/65 |
| 2015/0357109 | A1* | 12/2015 | Nobusaka | H01F 27/16 336/58 |
| 2016/0211730 | A1* | 7/2016 | Niwa | H02K 9/06 |
| 2017/0301451 | A1* | 10/2017 | Kim | H01F 41/061 |

* cited by examiner

REACTOR HAVING AIR DISCHARGE PATHS

TECHNICAL FIELD

The present disclosure relates to a reactor.

BACKGROUND ART

Examples of constituent elements of circuits for increasing or decreasing a voltage include reactors. For example, JP 2017-28142A discloses a reactor including: a coil having winding portions, a magnetic core arranged inside and outside the coil (winding portions) to form a closed magnetic circuit; and an insulating interposed member interposed between the coil (winding portions) and the magnetic core. The magnetic core includes inner core portions arranged inside the winding portions, and outer core portions arranged outside the winding portions. The insulating interposed member includes inner interposed members interposed between inner peripheral faces of the winding portions and the inner core portions, and end face interposed members interposed between end faces of the winding portions and the outer core portions. The reactor described in JP 2017-28142A further includes inner resin portions that fill gaps between the inner peripheral faces of the winding portions of the coil and the inner core portions, and outer resin portions that coat parts of the outer core portions.

In the reactor described in JP 2017-28142A, inner interposed members are interposed in parts of gaps between the winding portions and the inner core portions, and thus gaps (resin flow paths) are formed in the remaining portion between the inner peripheral faces of the winding portions and the outer peripheral faces of the inner core portions. Then, resin is caused to coat the outer perimeters of the outer core portions, and to flow into resin filling holes formed in the end face interposed members, so that the resin flow paths are filled with the resin from the end face sides of the winding portions, thereby integrally molding the outer resin portions and the inner resin portions.

JP 2017-28142A is an example of a related art.

SUMMARY

In reactors that include inner resin portions as described above, it is desirable to reduce molding failures in inner resin portions when molding the inner resin portions by filling resin flow paths with resin from the end face sides of the winding portions.

It is an object of the present disclosure to provide a reactor in which it is possible to reduce molding failures in inner resin portions when molding the inner resin portions.

The present disclosure is directed to a reactor including:
a coil having winding portions; and
a magnetic core having inner core portions arranged inside the winding portions, and outer core portions arranged outside the winding portions,
wherein the reactor further includes:
inner resin portions that fill gaps between inner peripheral faces of the winding portions and the inner core portions, and are continuous along an axial direction of the winding portions; and
inner interposed members that are interposed between the inner peripheral faces of the winding portions and the inner core portions, and form resin flow paths that provide flow paths of resin for forming the inner resin portions, the inner interposed members have spacers arranged between the winding portions and the inner core portions, and
the spacers are provided with air discharge paths that are in communication with the resin flow paths, and extend in the axial direction of the winding portions to at least one end face side of the winding portions.

According to the above-described reactor, it is possible to reduce molding failures in inner resin portions when molding the inner resin portions.

EMBODIMENTS

Figure 1:
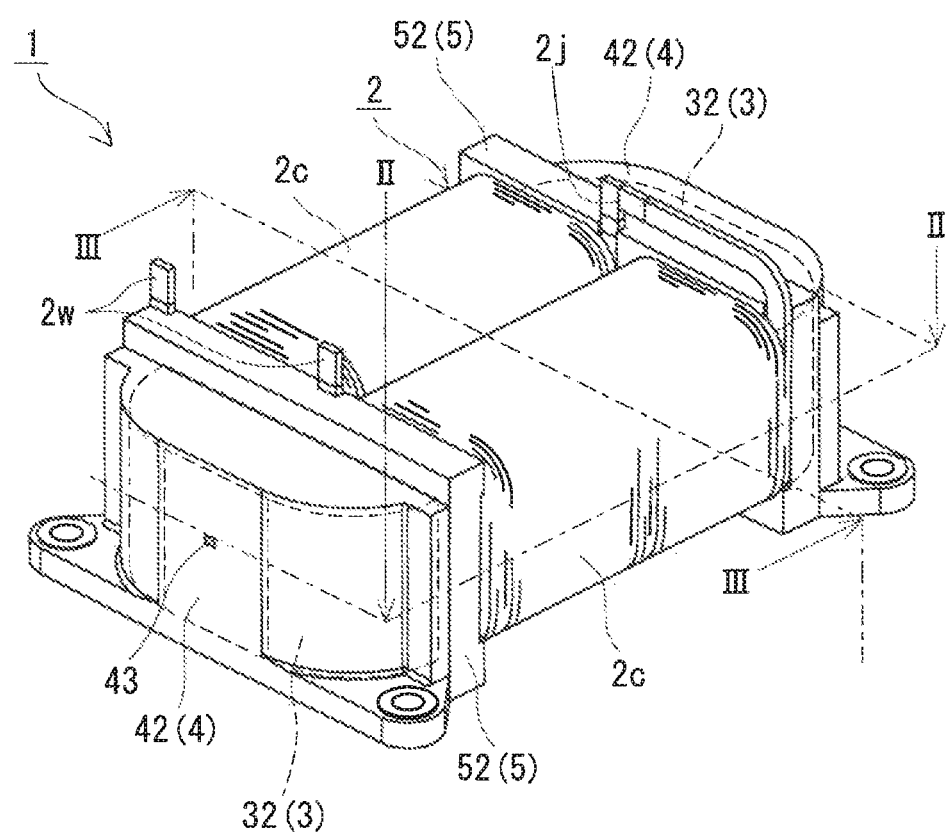
FIG. 1 is a schematic perspective view of a reactor according to an embodiment.

In reactors as disclosed in JP 2017-28142A, when molding inner resin portions by filling resin flow paths with resin from an end face side of winding portions, gas may be confined by the resin in the resin flow paths. In this case, molding failures such as filling failures or gas burning may occur in the inner resin portions.

The above-described reactor described in JP 2017-28142A is produced, for example, through resin molding in which an assembly obtained by assembling a coil, a magnetic core, and an insulating interposed member is placed in a mold, and melted resin is injected into the mold. Accordingly, it is possible to integrally mold the outer resin portions and the inner resin portions by causing the resin to coat the outer core portion, and to flow into the resin filling holes and fill filling resin flow paths formed between the winding portions and the inner core portions.

Typically, resin is injected into the mold while applying pressure to the resin through injection molding, but it is necessary to apply high pressure in order to sufficiently supply the resin throughout a narrow gap between the inner peripheral faces of the winding portions and the outer peripheral faces of the inner core portions. Furthermore, the melted resin may produce gas. In a conventional reactor, in a step of molding the inner resin portions, filling failures may occur in which, for example, air bubbles or voids are produced in the inner resin portions due to air inside the resin flow paths or gas produced from the resin (hereinafter, collectively referred to as "gas") being confined in the resin without being discharged during injection molding. Furthermore, gas burning may occur in the inner resin portions in which, for example, gas confined in the resin flow paths by resin that has been flowed into the resin flow paths is compressed and generates heat, and the heat carbonizes and deteriorates the resin.

When filling the resin flow paths with the resin from both end face sides of the winding portions, resin that has flowed in from both sides prevents gas in the resin flow paths from escaping, and the flows of resin merges inside the resin flow paths. Accordingly, gas is confined and compressed at the resin merging point, and thus molding failures are likely to occur in the inner resin portions. Especially in a case in which adjacent turns that form the winding portions of the coil are in close contact with each other and form no gap therebetween, gas in the resin flow paths cannot escape via gaps between the turns, and is confined in the resin flow paths, and thus molding failures are significantly likely to occur.

An aspect of a preferred embodiment is directed to providing air discharge paths for guiding gas in the resin flow paths toward the end faces of the winding portions in the inner interposed members. Accordingly, gas confined in the resin flow paths by resin when molding inner resin portions by filling the resin flow paths with the resin can be discharged from the end face sides of the winding portions via the air discharge paths, and thus it is possible to reduce molding failures in the inner resin portions.

First, embodiments will be listed and described.

(1) An aspect is directed to a reactor including:

a coil having winding portions; and a magnetic core having inner core portions arranged inside the winding portions, and outer core portions arranged outside the winding portions, wherein the reactor further includes:

inner resin portions that fill gaps between inner peripheral faces of the winding portions and the inner core portions, and are continuous along an axial direction of the winding portions; and inner interposed members that are interposed between the inner peripheral faces of the winding portions and the inner core portions, and form resin flow paths that provide flow paths of resin for forming the inner resin portions, the inner interposed members have spacers arranged between the winding portions and the inner core portions, and the spacers are provided with air discharge paths that are in communication with the resin flow paths, and extend in the axial direction of the winding portions to at least one end face side of the winding portions.

According to this reactor, spacers are provided with air discharge paths, and thus, when molding inner resin portions by filling the resin flow paths with the resin, gas in the resin flow paths can be guided toward the end faces of the winding portions via the air discharge paths and discharged therefrom. The reason for this is that gaps through which gas passes are present between the end faces of the winding portions and the end face interposed members. Accordingly, in the above-described reactor, when molding the inner resin portions, it is possible to suppress the occurrence of filling failures and gas burning in the inner resin portions, and to reduce molding failures in the inner resin portions.

(2) A mode of the above-described reactor is such that the air discharge paths are provided throughout the winding portions from one end face side to the other end face side.

According to this mode, when molding inner resin portions, gas in the resin flow paths can be discharged from both end face sides of the winding portions via the air discharge paths, and can be efficiently discharged, and thus it is possible to further reduce molding failures in the inner resin portions.

Details of Embodiments

Hereinafter, specific examples of a reactor according to an embodiment will be described with reference to the drawings. In the drawings, the same reference numerals denote the same constituent elements. Note that the present invention is not limited to these examples, and is specified by the scope of claims. All changes that come within the meaning and range of equivalency of the claims are intended to be embraced therein.

Embodiment

Configuration of Reactor

Figure 2:
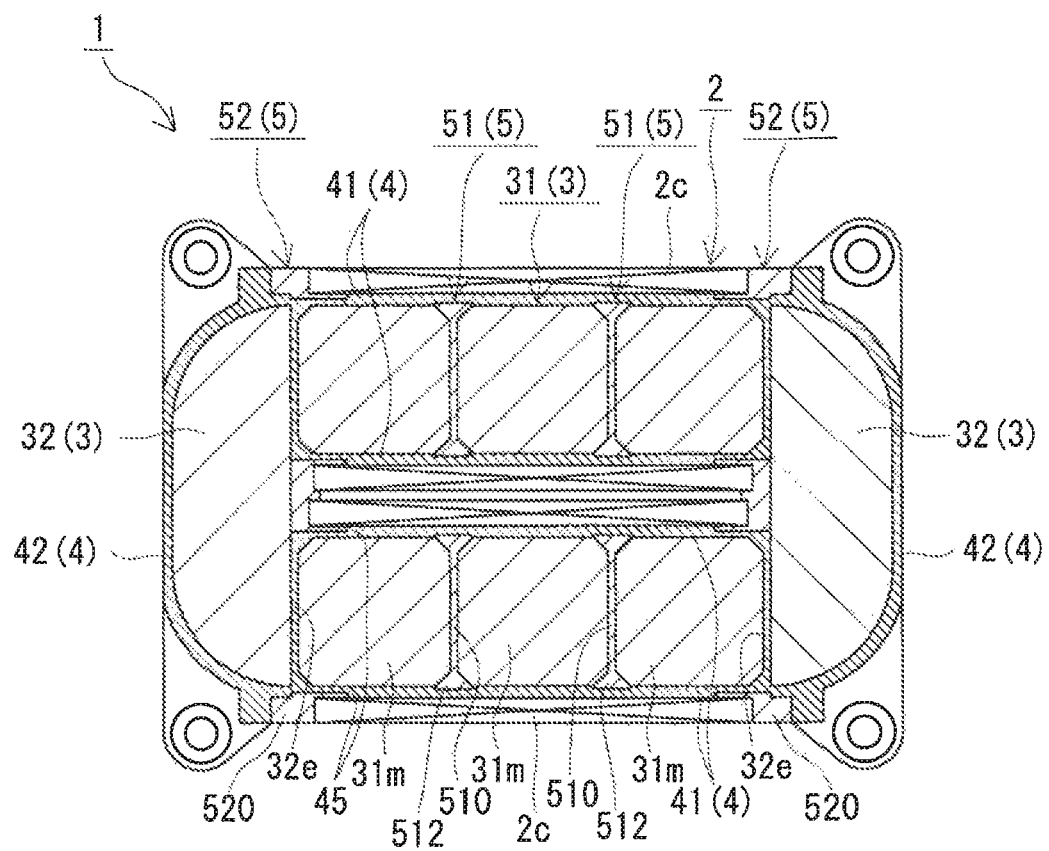
FIG. 2 is a schematic horizontal cross-sectional view along the line (II)-(II) shown in FIG. 1.
Figure 3:
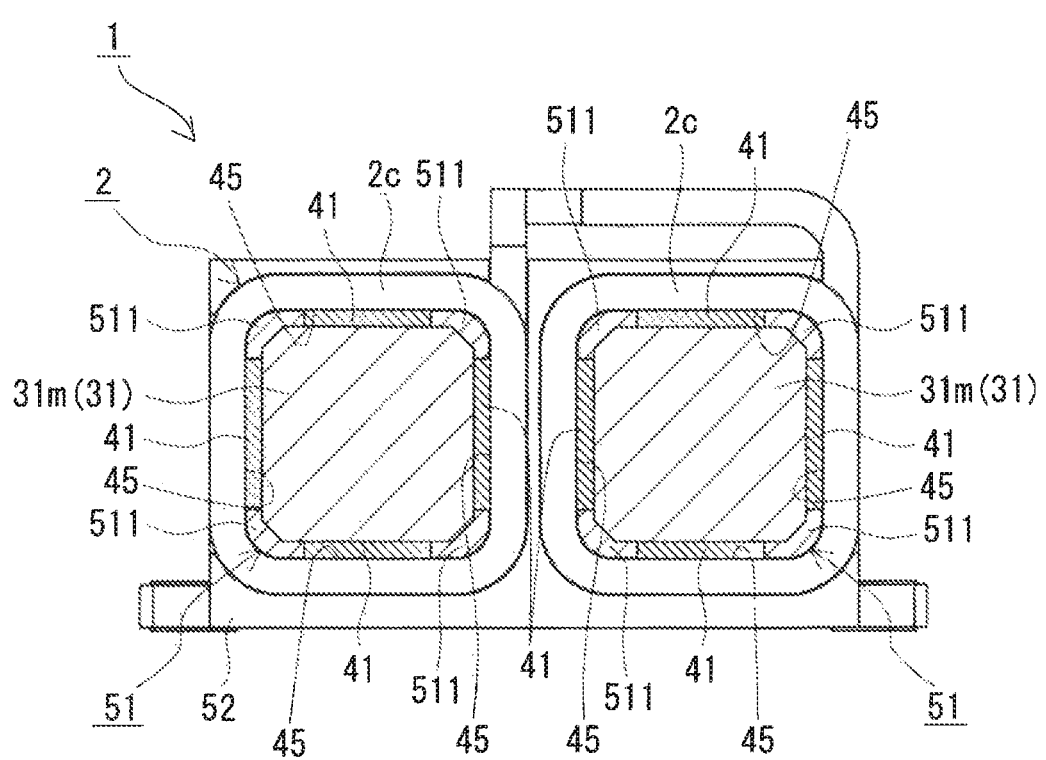
FIG. 3 is a schematic lateral cross-sectional view along the line (III)-(III) shown in FIG. 1.
Figure 4:
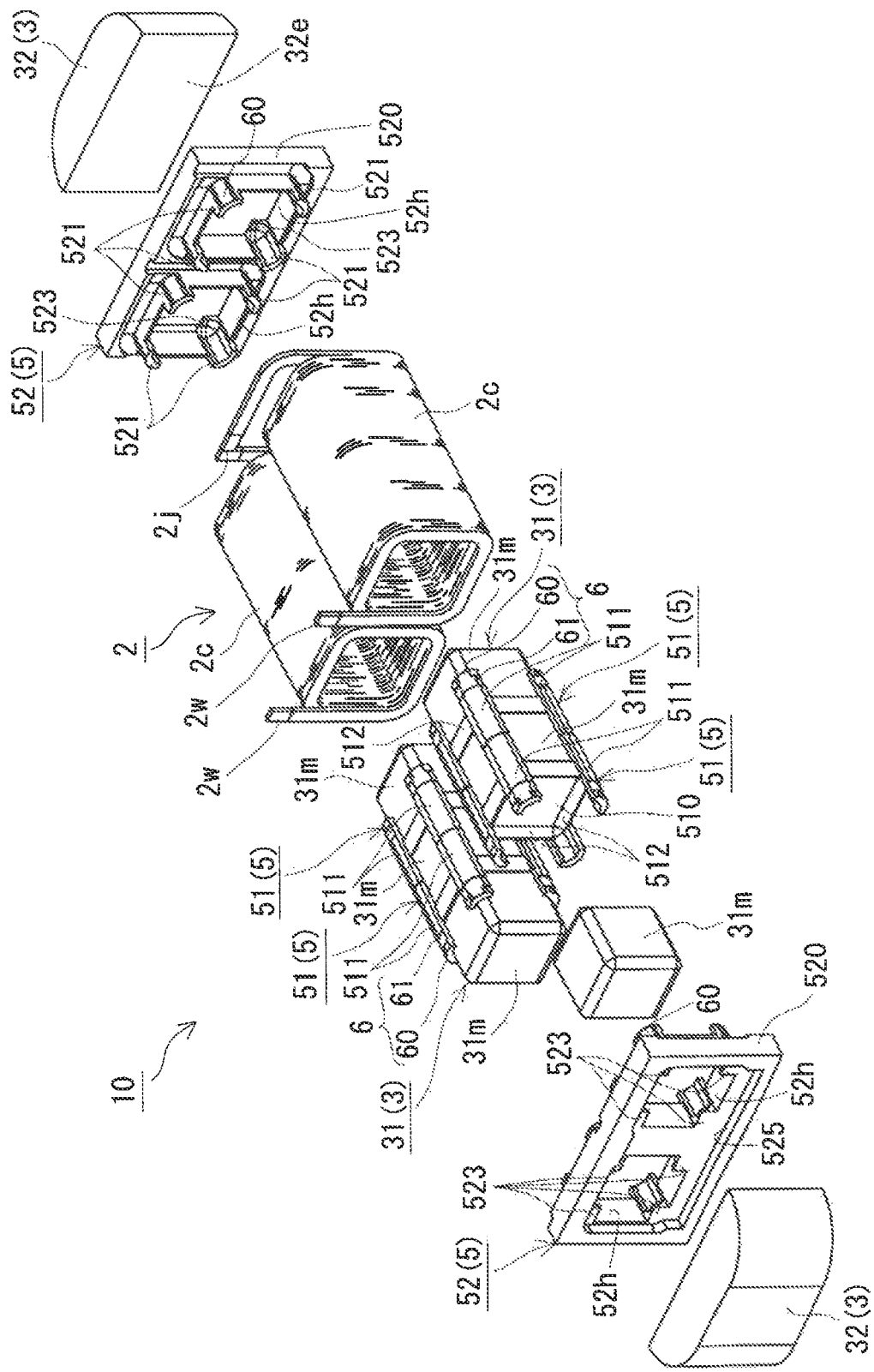
FIG. 4 is a schematic exploded perspective view of an assembly included in the reactor according to this embodiment.

Hereinafter, a reactor 1 according to this embodiment will be described with reference to FIGS. 1 to 8. As shown in FIGS. 1 to 4, the reactor 1 includes an assembly 10 (see FIG. 4) that has a coil 2 which has winding portions 2c, a magnetic core 3 arranged inside and outside the winding portions 2c, and an insulating interposed member 5 interposed between the coil 2 and the magnetic core 3. The coil 2 includes two winding portions 2c, and the winding portions 2c are arranged side by side. As shown in FIGS. 2 to 4, the magnetic core 3 includes two inner core portions 31 arranged inside the winding portions 2c, and two outer core portions 32 arranged outside the winding portions 2c and connected to both end portions of the inner core portions 31. The insulating interposed member 5 includes inner interposed members 51 (see FIG. 3) interposed between the inner peripheral faces of the winding portions 2c and the inner core portions 31, and end face interposed members 52 (also see FIGS. 5 and 6) interposed between the end faces of the winding portions 2c and the outer core portions 32. Furthermore, as shown in FIG. 2, the reactor 1 includes a mold resin portion 4 that integrally coats the magnetic core 3 (the inner core portions 31 and the outer core portions 32). The mold resin portion 4 includes inner resin portions 41 (see FIG. 3) that fill gaps between the inner peripheral faces of the winding portions 2c and the inner core portions 31, and outer resin portions 42 (see FIG. 1) that coat at least part of the outer core portions 32. One feature of the reactor 1 is that, as shown in FIGS. and 6, spacers 511 have air discharge paths 6.

Figure 5:
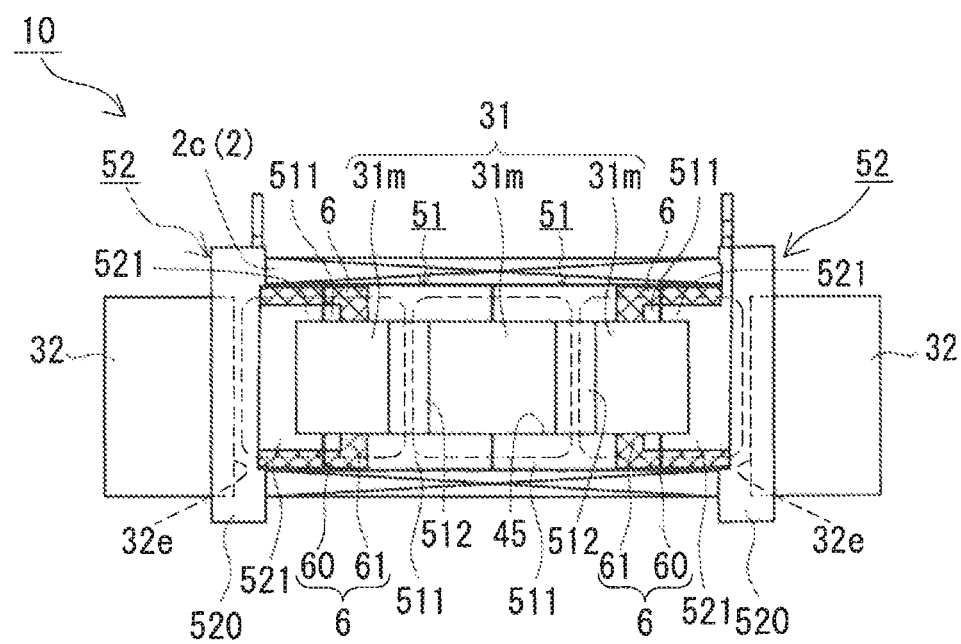
FIG. 5 is a schematic side view of the assembly included in the reactor according to this embodiment.
Figure 6:
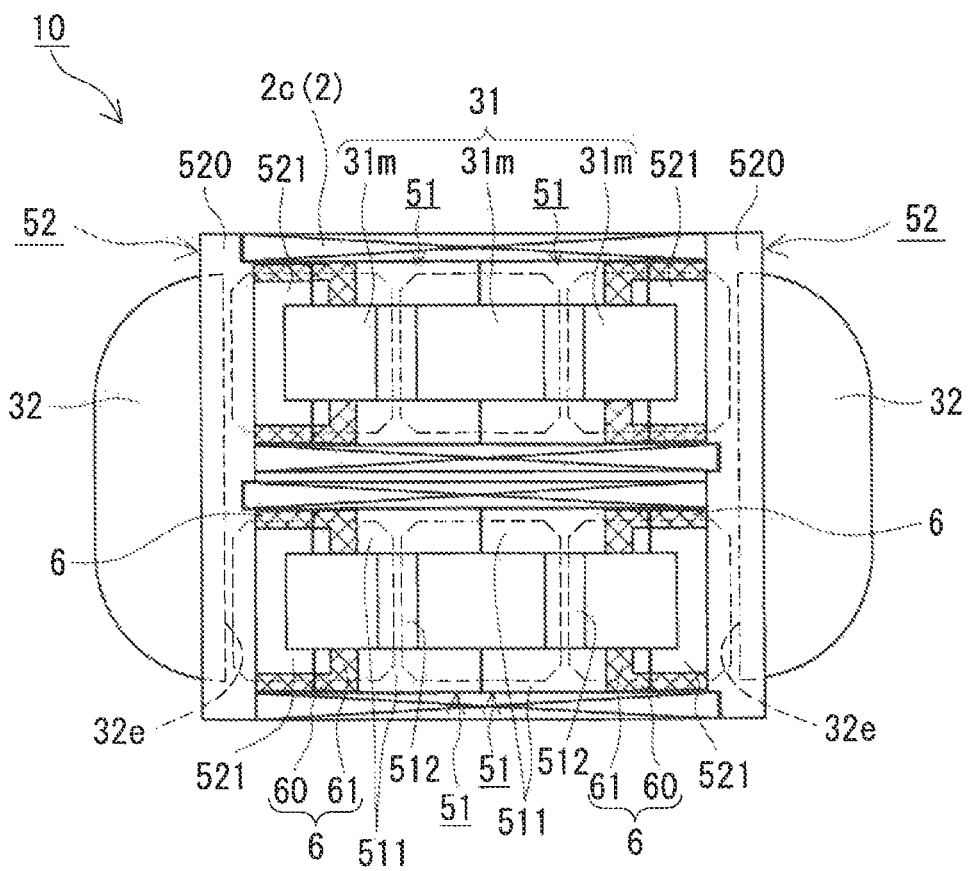
FIG. 6 is a schematic top view of the assembly included in the reactor according to this embodiment.

The reactor 1 is installed, for example, on an installation target (not shown) such as a converter case. In this example, in the reactor 1 (the coil 2 and the magnetic core 3), the lower sides in the sections of the diagrams in FIGS. 1, 4, and 5 correspond to an installation side that is brought into contact with the installation target, the installation side is taken as a "lower side", the side opposite to the installation side is taken as an "upper side", and the upper-lower direction is taken as a height direction. Furthermore, the direction in which the winding portions 2c of the coil 2 are arranged side by side (the upper-lower direction in the sections of the diagrams in FIGS. 2 and 6, and the left-right direction in the section of the diagram in FIG. 3) is taken as the lateral direction, and the direction along the axial direction of the coil 2 (the winding portions 2c) (the left-right direction in the sections of the diagrams in FIGS. 2, 5, and 6) is taken as the length direction. FIG. 2 is a horizontal cross-sectional view along a plane cutting the winding portions 2c into the upper and lower portions. FIG. 3 is a lateral cross-sectional view along the lateral direction that is orthogonal to the axial direction of the winding portions 2c. FIGS. 5 to 8 show a state before the mold resin portion 4 (the inner resin portions 41 and the outer resin portions 42) is molded, and FIGS. 5 and 6 show a state in which the winding portions 2c of the coil 2 are cut away for the sake of ease of description. In FIGS. 5 and 6, the air discharge paths 6 are indicated by hatching for the sake of ease of description (the same applies to FIGS. 9 and 10). Hereinafter, the configuration of the reactor 1 will be described in detail.

Coil

As shown in FIGS. 1 and 4, the coil 2 includes two winding portions 2c respectively formed by spirally winding two wires 2w, and ends of the wires 2w respectively forming the winding portions 2c are connected to each other via a joining portion 2j. The winding portions 2c are arranged side by side (in parallel) such that their axial directions are parallel to each other. The joining portion 2j is formed by joining the ends of the wires 2w respectively drawn out from the winding portions 2c, through a joining method such as welding, soldering, or brazing. The other ends of the wires 2w are respectively drawn out from the winding portions 2c in an appropriate direction (upward in this example). Terminal fittings (not shown) are attached as appropriate to the other ends of the wires 2w (i.e., both ends of the coil 2), which are electrically connected to an external apparatus (not shown) such as a power source. The coil 2 may be a known coil, and also may be, for example, a coil in which the winding portions 2c are constituted by one continuous wire.

Winding Portions

The winding portions 2c are respectively constituted by the wires 2w with the same specification, and are identical to each other in terms of the shape, size, winding direction, and number of turns, wherein adjacent turns constituting the winding portions 2c are in close contact with each other. The wires 2w are, for example, coated wires (so-called enameled wires) each having a conductor (copper, etc.) and an insulating coating (polyamide imide, etc.) around the outer circumference of the conductor. In this example, the winding portions 2c are edgewise coils each having a quadrangular tube shape (a rectangular tube shape, specifically) obtained by edgewise winding the wires 2w that are coated rectangular wires, and the end faces of the winding portions 2c viewed in the axial direction each have a rectangular shape with rounded corners (see FIGS. 3 and 7). There is no particular limitation on the shape of the winding portions 2c, and examples thereof include a cylindrical shape, an oval shape, an elongated cylindrical shape (racetrack shape), and the like. The specifications of the wires 2w and the winding portions 2c can be changed as appropriate.

In this example, as shown in FIG. 1, the coil 2 (the winding portions 2c) is not coated with the mold resin portion 4, and the outer peripheral face of the coil 2 is exposed when the reactor 1 is formed (also see FIGS. 2 and 3). Accordingly, heat is likely to be dissipated from the coil 2 to the outside, and the heat dissipation properties of the coil 2 can be increased.

Alternatively, the coil 2 may be a molded coil molded with an electrically insulating resin. In this case, the coil 2 can be protected from an external environment (dust, corrosion, etc.), and the mechanical strength and electrical insulating properties of the coil 2 can be increased. For example, by coating the inner peripheral faces of the winding portions 2c with resin, the electrical insulating properties between the winding portions 2c and the inner core portions 31 can be increased. Examples of the resin for molding the coil 2 include thermosetting resins such as epoxy resins, unsaturated polyester resins, urethane resins, and silicone resins, and thermoplastic resins such as polyphenylene sulfide (PPS) resins, polytetrafluoroethylene (PTFE) resins, liquid crystal polymers (LCP), polyamide (PA) resins (e.g., nylon 6 and nylon 66), polyimide (PI) resins, polybutylene terephthalate (PBT) resins, and acrylonitrile butadiene styrene (ABS) resins.

Alternatively, the coil 2 may be a fused coil in which fusion layers are interposed between adjacent turns constituting the winding portions 2c so that the adjacent turns are bonded by the fusion layers. In this case, adjacent turns can be in closer contact with each other. The fusion layers can be made of a heat-fusible resin, examples of which include thermosetting resins such as epoxy resins, silicone resins, and unsaturated polyesters. In the case of a fused coil, gaps between adjacent turns are sealed with the fusion layers, and thus there may not be any substantial gap between turns. In this example, the coil 2 is a fused coil in which fusion layers (not shown) are interposed between adjacent turns constituting the winding portions 2c.

Magnetic Core 3

As shown in FIGS. 2 to 4, the magnetic core 3 includes the two inner core portions 31 arranged inside the winding portions 2c, and the two outer core portions 32 arranged outside the winding portions 2c. The inner core portions 31 are positioned inside the winding portions 2c arranged side by side and are the portions around which the coil 2 is arranged. That is to say, the inner core portions 31 are arranged side by side (in parallel) as in the case of the winding portions 2c. Part of the end portions in the axial direction of the inner core portions 31 may project from the winding portions 2c. The outer core portions 32 are portions that are positioned on both end sides of the winding portions 2c and in which the coil 2 is not substantially arranged (i.e., portions projecting (exposed) from the winding portions 2c). The outer core portions 32 are arranged at both end portions of the inner core portions 31 so as to connect both end portions of the inner core portions 31. In this example, as shown in FIG. 2, the outer core portions 32 are arranged so as to sandwich the inner core portions 31 from both sides, and the end faces of the inner core portions 31 are respectively located facing and connected to inner end faces 32e of the outer core portions 32, so that the magnetic core 3 in the shape of a ring is formed. When the coil 2 is excited with application of electricity, the magnetic core 3 allows a magnetic flux to flow to form a closed magnetic circuit.

Inner Core Portions

The inner core portions 31 have a shape that conforms to the inner peripheral faces of the winding portions 2c. In this example, the inner core portions 31 are formed each in a quadrangular pillar shape (a rectangular pillar shape), and the end faces of the inner core portions 31 viewed in the axial direction each have a rectangular shape with chamfered corners (see FIGS. 3 and 7). The outer peripheral face of each of the inner core portions 31 have four flat faces (an upper face, a lower face, and two side faces) and four corners. In this example, the side of the winding portion 2c facing the other winding portion 2c is taken as the inner side, the side opposite to the inner side is taken as the outer side, and, of the two side faces, a side face on the inner side of a winding portion 2c facing the other winding portion 2c is taken as an inner face, and a side face on the outer side positioned on the opposite side is taken as an outer face.

Furthermore, in this example, as shown in FIGS. 2 and 4, each of the inner core portions 31 has a plurality of (three) inner core pieces 31*m*, and the inner core pieces 31*m* are coupled in the length direction.

The inner core portions 31 (the inner core pieces 31*m*) are made of a material containing a soft magnetic material. The inner core pieces 31*m* are made of, for example, a powder compact obtained through compression molding of a soft magnetic powder such as iron or an iron alloy (an Fe—Si alloy, an Fe—Si—Al alloy, an Fe—Ni alloy, etc.) or a coated soft magnetic powder further having an insulating coating, a compact obtained from a composite material containing a soft magnetic powder and a resin, or the like. Examples of the resin in the composite material include thermosetting resins, thermoplastic resins, room-temperature curable resins, and low-temperature curable resins. Examples of the thermosetting resins include unsaturated polyester resins, epoxy resins, urethane resins, and silicone resins. Examples of the thermoplastic resins include PPS resins, PTFE resins, LCP, PA resins, PI resins, PBT resins, and ABS resins. Examples thereof further include BMC (bulk molding compounds) in which calcium carbonate or glass fibers are mixed in unsaturated polyester, millable silicone rubbers, and millable urethane rubbers. In this example, the inner core pieces 31*m* are made of a powder compact.

Outer Core Portions

As shown in FIGS. 2 and 4, each of the outer core portions 32 is constituted by one core piece. As in the case of the inner core portions 31 (the inner core pieces 31*m*), the outer core portions 32 are made of a material containing a soft magnetic material, examples of which include the above-described powder compact and composite material. In this example, the outer core portions 32 are made of a powder compact.

There is no particular limitation on the shape of the outer core portions 32. In this example, as shown in FIG. 5, when the magnetic core 3 is formed, the outer core portions 32 project to a point lower than the inner core portions 31, and the lower faces of the outer core portions 32 are flush with the lower face of the coil 2 (the winding portions 2*c*). The upper faces of the outer core portions 32 are flush with the upper faces of the inner core portions 31.

Insulating Interposed Members

As shown in FIG. 4, the insulating interposed member 5 is a member that is interposed between the coil 2 (the winding portions 2*c*) and the magnetic core 3 (the inner core portions 31 and the outer core portions 32) and ensures the electrical insulating properties between the coil 2 and the magnetic core 3, and has the inner interposed members 51 and the end face interposed members 52. The insulating interposed member 5 (the inner interposed members 51 and the end face interposed members 52) is made of an electrically insulating resin, examples of which include epoxy resins, unsaturated polyester resins, urethane resins, silicone resins, PPS resins, PTFE resins, LCP, PA resins, PI resins, PBT resins, and ABS resins. In this example, the inner interposed members 51 and the end face interposed members 52 are made of a PPS resin.

Inner Interposed Members

Figure 7:
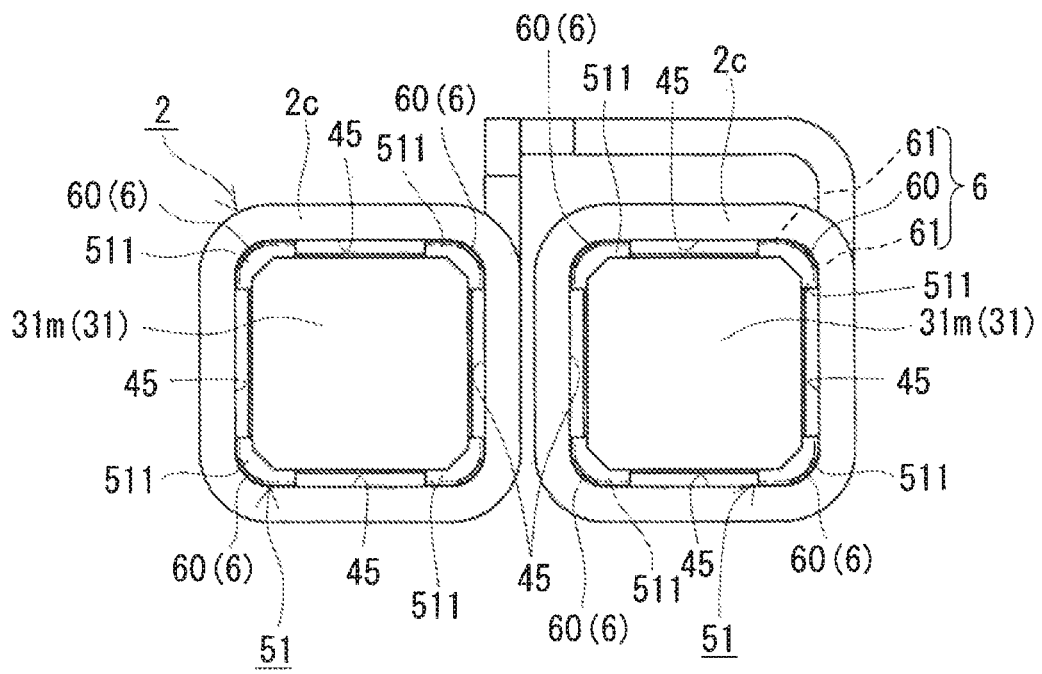
FIG. 7 is a schematic front view of an assembly of a coil, inner core portions, and inner interposed members included in the reactor according to this embodiment, when viewed from an end face side of the winding portions.

As shown in FIGS. 5 and 6, the inner interposed members 51 are interposed between the inner peripheral faces of the winding portions 2*c* and the outer peripheral faces of the inner core portions 31, and ensure the electrical insulating properties between the winding portions 2*c* and the inner core portions 31. Furthermore, as shown in FIG. 7, the inner interposed members 51 form resin flow paths 45 that provide flow paths of resin for forming the inner resin portions 41 (see FIG. 3), between the inner peripheral faces of the winding portions 2*c* and the outer peripheral faces of the inner core portions 31. The inner interposed members 51 have spacers 511 arranged between the winding portions 2*c* and the inner core portions 31. The spacers 511 are interposed between the inner peripheral faces of the winding portions 2*c* and the outer peripheral faces of the inner core portions 31, and form a predetermined space therebetween. Accordingly, the inner core portions 31 are positioned inside the winding portions 2*c*, and gaps are ensured between the inner peripheral faces of the winding portions 2*c* and the outer peripheral faces of the inner core portions 31, so that the resin flow paths 45 are formed. In this example, as shown in FIGS. to 7, the spacers 511 are arranged at the respective corners of the inner core portions 31, and extend in the axial direction of the winding portions 2*c*.

As shown in FIGS. 5 and 6, the inner interposed members 51 are arranged between the inner core pieces 31*m*, and two inner interposed members 51 are provided on each of the inner core portions 31. In this example, as shown in FIG. 4, rectangular plate portions 510 are interposed between the inner core pieces 31*m*. The plate portions 510 are provided with frame portions 512 surrounding the end portions of the inner core pieces 31*m* adjacent to the plate portions 510. As shown in FIG. 2, the plate portions 510 are interposed between the inner core pieces 31*m*, and form gaps between the inner core pieces 31*m*. As shown in FIG. 4, the spacers 511 are formed at the respective corners of the plate portions 510, and extend along the corners of the adjacent inner core pieces 31*m* (also see FIGS. 5 and 6). With the spacers 511, as shown in FIG. 7, the resin flow paths 45 are formed on the flat faces (the upper face, the lower face, and both side faces) of the inner core portions 31 on which the spacers 511 are not arranged. As shown in FIG. 3, the resin flow paths 45 provide flow paths of resin for forming the inner resin portions 41, and when the resin flow paths 45 are filled with resin, the inner resin portions 41 are molded. Furthermore, as shown in FIGS. 5 and 6, the spacers 511 of the adjacent inner interposed members 51 are brought into contact with each other and coupled, and arranged continuous with each other in the axial direction of the winding portions 2*c*.

End Face Interposed Members

Figure 8:
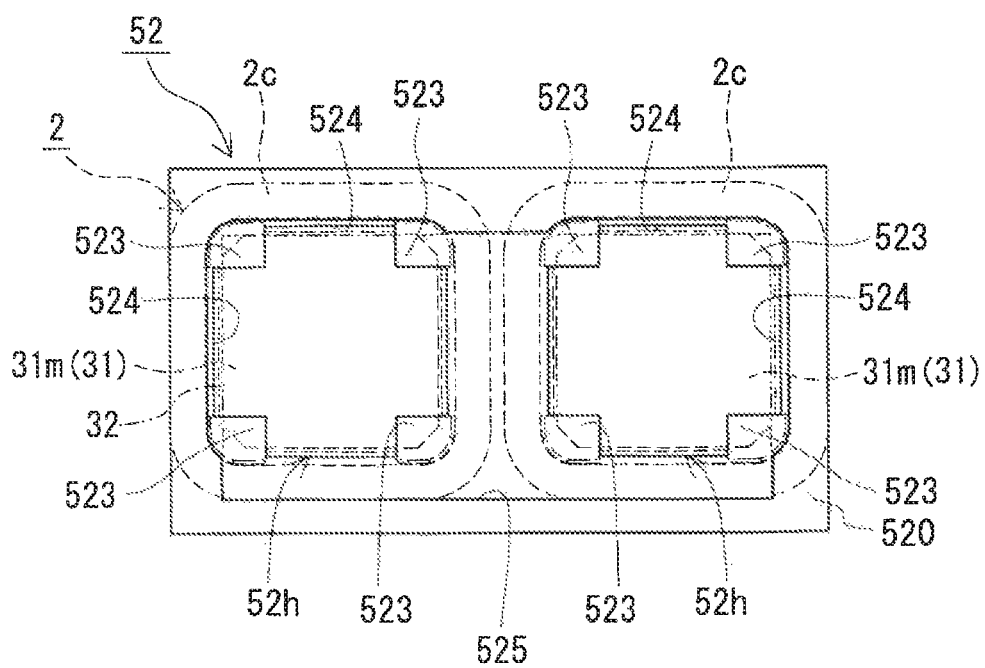
FIG. 8 is a schematic front view of an end face interposed member included in the reactor according to this embodiment, when viewed from a front face side.

As shown in FIGS. 5 and 6, the end face interposed members 52 are interposed between the end faces of the winding portions 2*c* and the inner end faces 32*e* of the outer core portions 32, and ensure the electrical insulating properties between the winding portions 2*c* and the outer core portions 32. The end face interposed members 52 are respectively arranged at both ends of the winding portions 2*c*, and have frame plate portions 520 in contact with the end faces of the winding portions 2*c*. As shown in FIGS. 4 and 8, each of the frame plate portions 520 is provided with two through holes 52*h* into which the end portions of the inner core portions 31 are respectively inserted. In this example, protrusions 523 protruding inward from the corners of the through holes 52*h* are formed at positions that comes into contact with the corners of the end faces of the inner core portions 31. The protrusions 523 are interposed between the corners of the end faces of the inner core portions 31 and the inner end faces 32*e* of the outer core portions 32, and gaps are formed between the end faces of the inner core portions 31 and the inner end faces 32*e* of the outer core portions 32. Furthermore, as shown in FIG. 8, the through holes 52*h* are formed such that resin filling holes 524 in communication with the inside of the winding portions 2*c* are formed between the through holes 52*h* and the outer core portions 32, when viewed from the outer core portion 32 side (the front face side) in the state of the assembly 10. The resin filling holes 524 are in communication with the resin flow paths 45 (see FIG. 7), and the resin flow paths 45 can be filled with the resin via the resin filling holes 524.

In this example, as shown in FIGS. 4 and 8, fitting portions 525 in the shape of recesses into which the inner end faces 32e of the outer core portions 32 are fitted are formed on the outer core portion 32 side (the front face side) of the end face interposed members 52. With the fitting portions 525, the outer core portions 32 are positioned with respect to the end face interposed members 52. Furthermore, as shown in FIGS. 4 to 6, spacers 521 projecting from the frame plate portions 520 are provided on the inner core portion 31 side (the back face side) of the end face interposed members 52. The spacers 521 extend in the axial direction of the winding portions 2c, are arranged continuous with the spacers 511 of the inner interposed members 51, are arranged between the winding portions 2c and the inner core portions 31, and form a predetermined space therebetween. Specifically, the spacers 521 are formed extending along the corners of the inner core pieces 31m positioned at the end portions of the inner core portions 31. With the spacers 521, the inner core portions 31 are positioned with respect to the end face interposed members 52, as a result of which, the inner core portions 31 and the outer core portions 32 are positioned via the end face interposed members 52. Furthermore, as shown in FIGS. 5 and 6, the spacers 521 are brought into contact with the spacers 511 and coupled therewith. Accordingly, the spacers 511 and 521 are arranged continuous in the axial direction along the entire length of the winding portions 2c, and thus the resin flow paths 45 (see FIG. 7) are divided in the circumferential direction by the spacers 511 and 521.

In this embodiment, as shown in FIGS. 5 and 6, the spacers 511 and 521 are provided with air discharge paths 6. The air discharge paths 6 will be described later in detail.

Mold Resin Portion

As shown in FIGS. 2 and 3, the mold resin portion 4 integrally coats the magnetic core 3 (the inner core portions 31 and the outer core portions 32), and includes the inner resin portions 41 and the outer resin portions 42. The mold resin portion 4 is made of an electrically insulating resin, examples of which include epoxy resins, unsaturated polyester resins, urethane resins, silicone resins, PPS resins, PTFE resins, LCP, PA resins, PI resins, PBT resins, and ABS resins. In this example, the inner resin portions 41 and the outer resin portions 42 are made of a PPS resin.

Inner Resin Portions

As shown in FIG. 3, the inner resin portions 41 are molded by causing resin to fill the resin flow paths 45 formed between the inner peripheral faces of the winding portions 2c and the outer peripheral faces of the inner core portions 31, and are in close contact with the inner peripheral faces of the winding portions 2c and the outer peripheral faces of the inner core portions 31.

Outer Resin Portions

As shown in FIGS. 1 and 2, the outer resin portions 42 are formed so as to coat at least part of the outer core portions 32. In this example, the outer resin portions 42 are molded so as to coat the entire outer core portions 32 exposed to the outside when the assembly 10 (see FIGS. 5 and 6) is formed. Specifically, the outer peripheral faces, the upper faces, and the lower faces of the outer core portions 32, excluding the inner end faces 32e of the outer core portions 32 in contact with the end face interposed members 52, are coated with the outer resin portions 42, and the surfaces of the outer core portions 32 are not exposed to the outside.

The mold resin portion 4 is molded, for example, through injection molding, and the outer resin portions 42 and the inner resin portions 41 are integrally molded through the resin filling holes 524 (see FIG. 8) formed in the end face interposed members 52. As shown in FIG. 2, the mold resin portion 4 integrates the inner core portions 31 and the outer core portions 32, and further integrates the coil 2, the magnetic core 3, and the insulating interposed member constituting the assembly 10 (see FIGS. 5 and 6). Furthermore, gaps between the end faces of the inner core portions 31 and the inner end faces 32e of the outer core portions 32 are also filled with resin.

When molding the mold resin portion 4 through injection molding, as shown in FIGS. 5 and 6, resin may be injected from one outer core portion 32, or from both outer core portions 32. In the former case, the resin flow paths 45 are filled with the resin from one end face side of the winding portions 2c via the resin filling holes 524 (see FIG. 8) of one end face interposed member 52 (hereinafter, referred to as "one-direction filling"). In the latter case, the resin flow paths 45 are filled with the resin from both end face sides of the winding portions 2c via the resin filling holes 524 (see FIG. 8) of both end face interposed members 52 (hereinafter, referred to as "both-direction filling").

When the mold resin portion 4 is molded through injection molding, as shown in FIG. 1, a gate mark 43 (indicated by cross hatching in the drawing) is formed at the outer resin portions 42. In the case of the above-described both-direction filling, the gate mark 43 is formed at both outer resin portions 42 coating the outer core portions 32. In this embodiment, the mold resin portion 4 is molded through both-direction filling, and the gate mark 43 is formed at both outer resin portions 42. Although FIG. 1 shows only the gate mark 43 formed at one of the outer resin portions 42, the gate mark 43 is formed in a similar manner also at the outer resin portion 42 coating the other outer core portion 32. The position and number of gate marks can be changed as appropriate. Furthermore, one outer resin portion 42 and the other outer resin portion 42 may be different from each other in terms of the position and number of gate marks.

Air Discharge Paths

As shown in FIGS. 5 and 6, the air discharge paths 6 are provided at the spacers 511 and 521, and are formed so as to be in communication with the resin flow paths 45 and to extend in the axial direction of the winding portions 2c to at least one end face side of the winding portions 2c. The air discharge paths 6 allow gas in the resin flow paths 45 to be guided toward the end faces of the winding portions 2c and discharged therefrom, when molding the inner resin portions 41 (see FIGS. 2 and 3) by filling the resin flow paths 45 with the resin. In this example, referring to FIGS. 5 and 6, the air discharge paths 6 provided at the spacers 511 and 521 positioned on one side (the left side in the drawing) in the axial direction of the winding portions 2c will be described. The air discharge paths 6 on the other side (the right side in the drawing) have a structure symmetric to that of the air discharge paths 6 on one side, and thus a description thereof has been omitted.

In this example, the air discharge paths 6 are made by forming grooves on the outer peripheral faces of the spacers 511 and 521 arranged at the respective corners of the inner core portions 31. Each of the air discharge paths 6 has connection paths 61 that is in communication with the resin flow paths 45, and a main path 60 that intersects the connection path 61 and extends in the axial direction toward one end face side of the winding portions 2c. The connection paths 61 are provided on the spacers 511, and are formed so as to be in communication with each of the resin flow paths 45 adjacent to the connection paths 61 in the circumferential direction. The main paths 60 are continuously provided from the spacer 511 to the spacer 521, and reach the frame plate portion 520 so as to extend to one end face side of the winding portions 2c. The connection paths 61 are in communication with a plurality of resin flow paths 45 divided by the spacers 511 in the circumferential direction. In this example, the connection paths 61 are in communication with the resin flow paths 45 facing the flat faces (the upper face, the lower face, and both side faces) of the inner core portions 31. The connection paths 61 in communication with the resin flow paths facing both faces sandwiching a corner of the inner core portions 31 are continuous with the main path 60 provided at the spacer 511 arranged at that corner, and share the main path 60. Accordingly, gas in the resin flow paths 45 can be guided from the connection paths 61 via the main paths 60 toward the end faces of the winding portions 2c, and discharged out of the winding portions 2c from gaps between the end faces of the winding portions 2c and the frame plate portions 520.

The depth of the air discharge paths 6 may be set as appropriate such that gaps through which gas passes are formed, and may be, for example, 10 to 500 μm, and preferably 20 to 400 μm. A larger depth of the air discharge paths 6 makes gas more likely to flow and be discharged therethrough, but also makes the resin that has filled the resin flow paths 45 likely to flow into the air discharge paths 6. It is also possible to allow only gas to pass through the air discharge paths 6 by adjusting their depth. In this case, the depth may be, for example, 20 to 60 μm, although it depends on the properties of the resin. The resin may present in at least part of the air discharge paths 6 after the inner resin portions 41 are molded.

The width of the air discharge paths 6 may be set as appropriate such that the cross-sectional area necessary to discharge gas in the resin flow paths 45 can be sufficiently ensured. Furthermore, the air discharge paths 6 may have any cross-sectional shape, such as a rectangular shape, a trapezoidal shape, a triangular shape, or a semi-circular shape.

In this example, the air discharge paths 6 are constituted by grooves, but are not limited to this. They may be formed as through holes. Furthermore, in this example, the connection paths 61 are provided in the spacers 511, but the connection paths 61 may be provided in the spacers 521.

Method of Producing Reactor

Hereinafter, an example of the method of producing the reactor 1 will be described. The method of producing the reactor is roughly divided into an assembly assembling step and a resin molding step.

Assembly Assembling Step

In the assembly assembling step, the assembly 10 of the coil 2, the magnetic core 3, and the insulating interposed member 5 is assembled (see FIGS. 4 to 8).

The inner interposed members 51 are arranged between the inner core pieces 31m to form the inner core portions 31, the inner core portions 31 are respectively inserted to the winding portions 2c of the coil 2, and thus the assembly of the coil 2, the inner core portions 31, and the inner interposed members 51 is prepared. Then, the end face interposed members 52 are respectively arranged at both ends of the winding portions 2c, and the outer core portions 32 are arranged so as to sandwich the inner core portions 31 from both ends. Accordingly, the magnetic core 3 in the shape of a ring is constituted by the inner core portions 31 and the outer core portions 32. In this manner, the assembly 10 including the coil 2, the magnetic core 3, and the insulating interposed member 5 is assembled. When the end face interposed members 52 are viewed from the outer core portions 32 side in the state of the assembly 10, the resin filling holes 524 are formed in the end face interposed members 52 (see FIG. 8).

Resin Molding Step

In the resin molding step, the outer core portions 32 are coated with resin, and the resin flow paths 45 are filled with the resin, so that the outer resin portions 42 and the inner resin portions 41 are integrally molded (see FIGS. 2 and 3).

The assembly 10 is arranged in a mold, and resin is injected into the mold from an outer core portion 32 side of the assembly 10, thereby performing resin molding. In this embodiment, through both-direction filling that injects resin from both outer core portion 32 sides, the outer core portions 32 are coated with resin, and the resin flow paths 45 are filled with the resin from both end face sides of the winding portions 2c via the resin filling holes 524 (see FIG. 8) of the end face interposed members 52. At this time, gaps between the end faces of the inner core portions 31 and the inner end faces 32e of the outer core portions 32 are filled with the resin. Then, the resin that has filled is cured, and thus the outer resin portions 42 and the inner resin portions 41 are integrally molded. Accordingly, the mold resin portion 4 is constituted by the inner resin portions 41 and the outer resin portions 42, the inner core portions 31 and the outer core portions 32 are integrated, and the coil 2, the magnetic core 3, and the insulating interposed member 5 are integrated.

In this embodiment, as shown in FIGS. 5 and 6, the spacers 511 and 521 are provided with the air discharge paths 6, and thus, when the resin flow paths are filled with the resin, gas in the resin flow paths 45 can be guided toward the end faces of the winding portions 2c via the air discharge paths 6. Specifically, gas in the resin flow paths 45 is pushed into the connection paths 61 by resin that has flowed in from both sides pushes, flows from the connection paths 61 to the main paths 60, and is guided toward the end faces of the winding portions 2c. Since gaps are present between the end faces of the winding portions 2c and the frame plate portions 520, the gas that has been guided toward the end faces of the winding portions 2c is discharged out of the winding portions 2c from gaps between the end faces of the winding portions 2c and the frame plate portions 520.

Actions and Effects

According to the reactor 1 according to the foregoing embodiment, the spacers 511 are provided with the air discharge paths 6, and thus, when molding the inner resin portions 41 by filling the resin flow paths 45 with the resin, gas in the resin flow paths 45 can be guided toward the end faces of the winding portions 2c via the air discharge paths 6 and discharged therefrom. Accordingly, gas is unlikely to be confined in the resin flow paths 45, and thus it is possible to reduce molding failures such as filling failures and gas burning in the inner resin portions 41.

Applications

The reactor 1 can be preferably used, for example, in various converters such as vehicle-mounted converters (typically DC-DC converters) that are mounted in vehicles such as hybrid cars, plug-in hybrid cars, electric vehicles, and fuel-cell vehicles, and converters for air conditioners, and constituent elements of power conversion apparatuses.

Modified Examples

Figure 9:
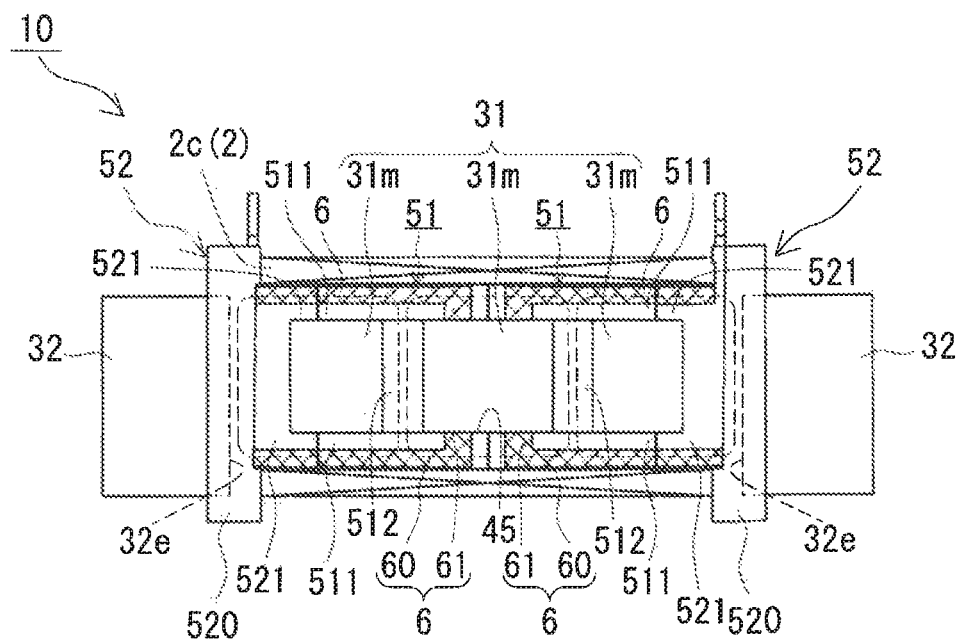
FIG. 9 is a schematic side view showing a modified example of air discharge paths.
Figure 10:
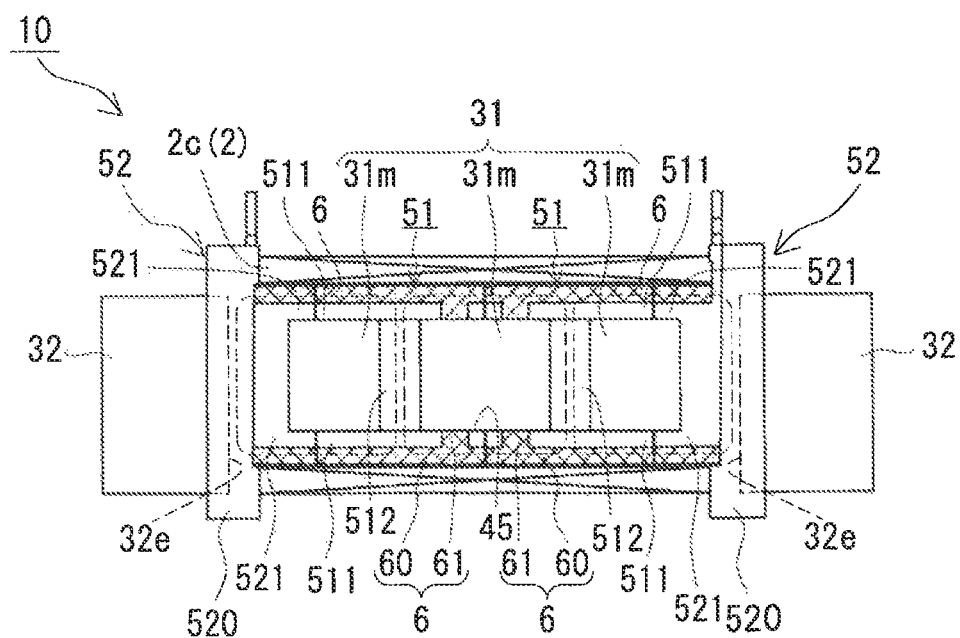
FIG. 10 is a schematic side view showing another modified example of air discharge paths.

The configuration of the air discharge paths 6 described in the foregoing embodiment may be changed as shown in FIGS. 9 and 10. The air discharge paths 6 shown in FIG. 9 are different from those in the foregoing embodiment in terms of the position of the connection paths 61, wherein the connection paths 61 are provided at the middle in the length direction of the resin flow paths 45 so as to be in communication with the resin flow paths 45. In the case of both-direction filling, flows of resin flowing in from both sides of the resin flow paths 45 merges inside the resin flow paths 45, and gas is likely to be confined at the resin merging point. Typically, the resin merging point is a middle position in the length direction of the resin flow paths 45, and is a final filling point where the resin flowing in finally reaches. Accordingly, if the connection paths 61 are positioned so as to be in communication with the middle of the resin flow paths 45, gas at the final filling point of resin in the resin flow paths 45 can be efficiently discharged via the air discharge paths 6, and thus it is possible to further reduce molding failures. Note that the middle of the resin flow paths 45 refers to a middle region including the middle position in the length direction of the resin flow paths 45, and specifically refers to a middle region when the resin flow paths 45 are divided into five equal regions in the length direction.

As another modified example, the air discharge paths 6 may be provided throughout the winding portions 2c from one end face side to the other end face side. For example, as shown in FIG. 10, the main paths 60 of the air discharge paths 6 on one side and the air discharge paths 6 on the other side are arranged continuous with each other in the axial direction of the winding portions 2c. In this case, gas in the resin flow paths 45 from the air discharge paths 6 can be discharged from both end face sides of the winding portions 2c, and can be efficiently discharged, and thus it is possible to further reduce molding failures.

LIST OF REFERENCE NUMERALS

1 Reactor
10 Assembly
2 Coil
2w Wire
  2c Winding portion
  2j Joining portion
3 Magnetic core
31 Inner core portion
  31m Inner core piece
32 Outer core portion
  32e Inner end face
4 Mold resin portion
41 Inner resin portion
42 Outer resin portion
43 Gate mark
45 Resin flow path
5 Insulating interposed member
51 Inner interposed member
  510 Plate portion
  511 Spacer
  512 Frame portion
52 End face interposed member
  520 Frame plate portion
  52h Through hole
  521 Spacer
  523 Protrusion
  524 Resin filling hole
  525 Fitting portion
6 Air discharge path
60 Main path
61 Connection path

What is claimed is:

1. A reactor comprising:
   a coil having winding portions;
   a magnetic core having inner core portions arranged inside the winding portions, and outer core portions arranged outside the winding portions;
   inner resin portions filling gaps between inner peripheral faces of the winding portions and the inner core portions, and being continuous along an axial direction of the winding portions; and
   inner interposed members that are interposed between the inner peripheral faces of the winding portions and the inner core portions, and forming resin flow paths configured to provide flow paths of resin for forming the inner resin portions, wherein:
   the inner interposed members have spacers arranged between the winding portions and the inner core portions, and
   at least one of the spacers include at least one air discharge path extending from a surface of one inner core portion to the at least one end face side of the winding portions, the at least one air discharge path being: (i) disposed between the surface of one inner core portion and the at least one end face side of the winding portion, and (ii) in communication with one of the resin flow paths.

2. The reactor according to claim 1, wherein the air discharge paths are provided throughout the winding portions from one end face side to the other end face side.

* * * * *